(12) United States Patent
Onishi

(10) Patent No.: US 9,982,159 B2
(45) Date of Patent: May 29, 2018

(54) PAINT COMPOSITION AND METHOD FOR FORMING MULTI-LAYERED COATING FILM

(71) Applicant: KANSAI PAINT CO., LTD., Hyogo (JP)

(72) Inventor: Kohei Onishi, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days. days.

(21) Appl. No.: 14/438,349

(22) PCT Filed: Oct. 11, 2013

(86) PCT No.: PCT/JP2013/077749
§ 371 (c)(1),
(2) Date: Apr. 24, 2015

(87) PCT Pub. No.: WO2014/097720
PCT Pub. Date: Jun. 26, 2014

(65) Prior Publication Data
US 2015/0284585 A1 Oct. 8, 2015

(30) Foreign Application Priority Data
Dec. 21, 2012 (JP) ................................. 2012-279909

(51) Int. Cl.
| | | |
|---|---|---|
| C09D 133/14 | (2006.01) | |
| C09D 133/02 | (2006.01) | |
| C09D 163/00 | (2006.01) | |
| C09D 169/00 | (2006.01) | |
| C09D 171/00 | (2006.01) | |
| B05D 1/36 | (2006.01) | |
| B05D 7/00 | (2006.01) | |
| B05D 7/14 | (2006.01) | |
| B05D 7/24 | (2006.01) | |
| C08G 59/40 | (2006.01) | |
| C08K 5/19 | (2006.01) | |
| C08K 5/3435 | (2006.01) | |
| C08K 5/3475 | (2006.01) | |
| C08K 5/5419 | (2006.01) | |
| C09D 171/02 | (2006.01) | |
| C08F 220/14 | (2006.01) | |
| C08F 220/18 | (2006.01) | |
| C09D 133/08 | (2006.01) | |
| C09J 133/08 | (2006.01) | |

(52) U.S. Cl.
CPC ........... *C09D 133/14* (2013.01); *B05D 7/148* (2013.01); *B05D 7/572* (2013.01); *C08F 220/14* (2013.01); *C08F 220/18* (2013.01); *C08G 59/40* (2013.01); *C08K 5/19* (2013.01); *C08K 5/3435* (2013.01); *C08K 5/3475* (2013.01); *C08K 5/5419* (2013.01); *C09D 7/40* (2018.01); *C09D 133/02* (2013.01); *C09D 133/08* (2013.01); *C09D 163/00* (2013.01); *C09D 169/00* (2013.01); *C09D 171/02* (2013.01); *C09J 133/08* (2013.01); *Y10T 428/31507* (2015.04); *Y10T 428/31511* (2015.04)

(58) Field of Classification Search
CPC .......... C08L 63/00–63/10; C08L 71/02; C08L 33/02; C09D 163/00–163/10; C09D 171/02; C09D 133/02; B05D 7/148; B05D 7/57; B05D 7/572; C08K 5/19; C08F 220/04; C08F 220/06; C08G 59/42–59/4292; C09J 171/02; C09J 163/00–163/10; C09J 133/02; C08J 2333/02; C08J 2371/02; C08J 2363/00–2363/10
See application file for complete search history.

(56) References Cited

U.S. PATENT DOCUMENTS

| | | | | |
|---|---|---|---|---|
| 4,871,806 | A * | 10/1989 | Shalati | C08G 59/4284 525/108 |
| 7,108,919 | B2 * | 9/2006 | Shalati | C08G 59/4284 428/413 |
| 8,580,385 | B2 | 11/2013 | Kitagawa et al. | |
| 2004/0249061 | A1 * | 12/2004 | Sunkara | C08G 18/4063 524/589 |
| 2011/0293844 | A1 | 12/2011 | Kasai et al. | |
| 2011/0300389 | A1 | 12/2011 | Kitagawa et al. | |
| 2012/0021228 | A1 | 1/2012 | Kitagawa et al. | |

FOREIGN PATENT DOCUMENTS

| | | |
|---|---|---|
| CN | 102325847 | 1/2012 |
| JP | 2008-19283 | 1/2008 |
| JP | 2009-28576 | 2/2009 |
| JP | 2009-262002 | 11/2009 |
| JP | 2010-215885 | 9/2010 |
| JP | 2010-241854 | 10/2010 |
| JP | 2010-253383 | 11/2010 |
| JP | 2010-285458 | 12/2010 |
| WO | 2009/014226 | 1/2009 |
| WO | 2009/075392 | 6/2009 |
| WO | 2010/082607 | 7/2010 |

OTHER PUBLICATIONS

Scifinder properties of CAS 25322-69-4 (2017).*
International Search Report dated Nov. 19, 2013 in International (PCT) Application No. PCT/JP2013/077749.

* cited by examiner

*Primary Examiner* — Kregg T Brooks
(74) *Attorney, Agent, or Firm* — Wenderoth, Lind & Ponack, L.L.P.

(57) ABSTRACT

This invention relates to a coating composition comprising a carboxy-containing compound (A), a polyepoxide (B), and a specific polyol (C) having a number average molecular weight of 300 to 1,500, and a method for forming a multilayer coating film using the coating composition as a clear coating composition, the method comprising sequentially applying an aqueous first colored coating composition, an aqueous second colored coating composition, and the clear coating composition to a substrate, and heat-curing the resulting coating films all at once to form the multilayer coating film.

6 Claims, No Drawings

PAINT COMPOSITION AND METHOD FOR FORMING MULTI-LAYERED COATING FILM

CROSS-REFERENCE TO RELATED APPLICATIONS

This application claims priority to Japanese Patent Application No. 2012-279909 filed on Dec. 21, 2012, the entire contents of which are incorporated herein by reference.

TECHNICAL FIELD

Technical Field

The present invention relates to a coating composition and a method for forming a multilayer coating film using the coating composition.

Background Art

As methods for forming coating films on automobile bodies, a 3-coat 2-bake process and a 2-coat 2-bake process have been widely used. The 3-coat 2-bake process comprises the following steps in order: after subjecting a substrate to electrodeposition coating and curing by heating, application of an intermediate coating composition→curing by heating→application of a base coating composition→preheating (preliminary heating)→application of a clear coating composition→curing by heating. The 2-coat 2-bake process comprises the following steps in order: after subjecting a substrate to electrodeposition coating and curing by heating, application of an intermediate coating composition→curing by heating→application of a top coating composition→curing by heating.

In general, the 3-coat 2-bake process is used for forming a coating film of a so-called metallic color by using a base coating composition comprising an effect pigment, whereas the 2-coat 2-bake process is used for forming a coating film of a so-called solid color, such as white or black, by using a top coating composition comprising a color pigment.

In recent years, for the purpose of saving energy, consideration has been given to omission of the heat-curing step that is performed after applying the intermediate coating composition, and research has been conducted on a 3-coat 1-bake process comprising the following steps in order: application of an intermediate coating composition→preheating (preliminary heating)→application of a base coating composition→preheating (preliminary heating)→application of a clear coating composition→curing by heating, and on a 2-coat 1-bake process comprising the following steps in order: application of an intermediate coating composition→preheating (preliminary heating)→application of a top coating composition→curing by heating.

From the viewpoint of minimizing environmental pollution caused by volatilization of organic solvents, particular demand exists for a 3-coat 1-bake process or a 2-coat 1-bake process using aqueous coating compositions as the intermediate coating composition, base coating composition, and top coating composition.

However, in the 3-coat 1-bake process using an aqueous intermediate coating composition and an aqueous base coating composition, and in the 2-coat 1-bake process using an aqueous intermediate coating composition and an aqueous top coating composition, a mixed layer is formed between the aqueous intermediate coating composition and the aqueous base coating composition, between the aqueous base coating composition and the clear coating composition, or between the aqueous intermediate coating composition and the aqueous top coating composition. This may cause insufficient smoothness and distinctness of image of the resulting coating film, and thus these have been problems that require solutions.

In the 3-coat 1-bake process and the 2-coat 1-bake process, which omit the heat-curing step that is performed after applying the intermediate coating composition, only one heat-curing step is performed. This is such a severe condition that concealment of the surface state (i.e., irregularities) of a substrate tends to be insufficient compared to the hitherto known coating process. Thus, in a harsh situation, for example, in particular when the surface roughness of a substrate, such as an electrodeposition-coated surface, is large, application of the intermediate coating composition is more susceptible to the influence of the substrate. These also have been problems that require solutions, since they tend to cause insufficient smoothness and distinctness of image of the resulting coating film.

For example, Patent Literature 1 discloses a method for forming a multilayer coating film that employs a coating process for forming a multilayer coating film by a 3-coat 1-bake process using an aqueous intermediate coating composition, an aqueous base coating composition, and a clear coating composition, wherein a specific aqueous base coating composition is applied to an intermediate coating film that has been adjusted to have a specific solids content, the resulting base coating film is adjusted to have a specific solids content, a clear coating composition containing a carboxy-containing compound and a polyepoxide is applied thereto, and the intermediate coating film, the base coating film, and the clear coating film are cured all at once under specific heating conditions. However, the multilayer coating film obtained by this coating film-forming method may have insufficient smoothness and distinctness of image.

To suppress a mixed layer in a multilayer coating film and improve the finished appearance, for example, Patent Literature 2 discloses a method for forming a multilayer coating film that employs a 3-coat 1-bake process comprising sequentially applying an aqueous first colored coating composition, an aqueous second colored coating composition, and a clear coating composition to a substrate, and simultaneously heat-curing the resulting three layers of the multilayer coating film, wherein an aqueous first colored coating composition (X) comprises an acrylic resin (A), a curing agent (B), and a urethane resin emulsion (C), and a first colored coating film formed from the aqueous first colored coating composition (X) has a water swelling rate of 100% or less and an organic solvent swelling rate of 300% or less before a second base is applied. However, the multilayer coating film obtained by this coating film-forming method may have insufficient smoothness and distinctness of image.

Further, for example, Patent Literature 3 discloses an aqueous coating composition comprising an acrylic resin (A), a curing agent (B), and a urethane resin emulsion (C), the urethane resin emulsion being prepared using constituent components comprising a polyisocyanate component that contains an alicyclic diisocyanate, and a polycarbonate diol component obtained from a diol component that contains a cycloalkylene group-containing alicyclic diol having 6 or more carbon atoms.

Patent Literature 3 also discloses a method for forming a multilayer coating film that employs a 3-coat 1-bake process comprising sequentially applying an aqueous first colored coating composition, an aqueous second colored coating composition, and a clear coating composition to a substrate, and simultaneously heat-curing the resulting three layers of the multilayer coating film, wherein the aforementioned aqueous coating composition is used as the aqueous first colored coating composition. Patent Literature 3 discloses, as a preferable embodiment of the aqueous first colored coating composition, a coating composition further comprising a specific oligomer. However, the effect of improving the finished appearance in terms of smoothness, distinctness of image, etc., may be insufficient with this coating film-forming method.

To prevent a mixed layer in a multilayer coating film and improve the finished appearance of a multilayer coating film by suppressing coating film internal stress, for example, Patent Literature 4 discloses a method for forming a multilayer coating film that employs a 3-coat 1-bake process comprising the step of simultaneously bake-curing an intermediate coating film, a base coating film, and a clear coating film, wherein an aqueous intermediate coating composition used for forming the intermediate coating film comprises a specific acrylic resin emulsion, a completely alkyl-etherified melamine resin, and a carbodiimide compound, and an aqueous base coating composition used for forming the base coating film comprises a specific acrylic resin emulsion and a specific polyether polyol. In this coating film-forming method, prevention of a mixed layer between the intermediate coating film and the base coating film is attempted by suppressing the internal stress of the intermediate coating film. However, the multilayer coating film obtained by this method may have an insufficient finished appearance.

CITATION LIST

Patent Literature

PTL 1: JP2009-028576A
PTL 2: WO2010/082607
PTL 3: JP2010-215885A
PTL 4: JP2009-262002A

SUMMARY OF INVENTION

Technical Problem

An object of the present invention is to provide a clear coating composition that makes it possible to form a multilayer coating film that is less susceptible to the surface roughness of a substrate, has excellent concealment of the surface state (i.e., irregularities) of the substrate, and exhibits excellent smoothness, distinctness of image, and weatherability, when an aqueous first colored coating composition, an aqueous second colored coating composition, and the clear coating composition are sequentially applied to the substrate, and the resulting coating films are cured all at once to form the multilayer coating film; and a method for forming a multilayer coating film using the clear coating composition.

Solution to Problem

The present inventor conducted extensive research to achieve the above object and found that in a coating process for forming a multilayer coating film by a 3-coat 1-bake process, incorporation of a specific polyol in a clear coating composition is highly effective to improve concealment of the surface state (i.e., irregularities) of a substrate, and when a coating composition comprising a carboxy-containing compound (A), a polyepoxide (B), and a specific polyol (C) is used as a clear coating composition, the above object can be achieved. The present invention has been accomplished based on these findings.

More specifically, the present invention provides a coating composition used as a clear coating composition (Z) in a method for forming a multilayer coating film, the method comprising sequentially performing the following steps (1) to (4) on a substrate:

(1) applying an aqueous first colored coating composition (X) to form a first colored coating film;

(2) applying an aqueous second colored coating composition (Y) to the first colored coating film formed in step (1) to form a second colored coating film;

(3) applying a clear coating composition (Z) to the second colored coating film formed in step (2) to form a clear coating film; and (4) heat-curing the first colored coating film, the second colored coating film, and the clear coating film formed in steps (1) to (3), all at once, the coating composition comprising a carboxy-containing compound (A), a polyepoxide (B), and a polyol (C) having a number average molecular weight of 300 to 1,500, the polyol (C) being at least one member selected from the group consisting of polyoxyalkylene-containing polyols (C1) and polycarbonate polyols (C2).

Further, the present invention provides a method for forming a multilayer coating film, the method comprising performing the following steps (1) to (4) on a substrate:

(1) applying an aqueous first colored coating composition (X) to form a first colored coating film;

(2) applying an aqueous second colored coating composition (Y) to the first colored coating film formed in step (1) to form a second colored coating film;

(3) applying the aforementioned coating composition as a clear coating composition (Z) to the second colored coating film formed in step (2) to form a clear coating film; and (4) heat-curing the first colored coating film, the second colored coating film, and the clear coating film formed in steps (1) to (3), all at once.

Further, the present invention provides an article coated by the aforementioned method for forming a multilayer coating film.

Advantageous Effects of Invention

It is considered that because the polyol in the coating composition of the present invention has a low molecular weight, thermal flowability in the curing process for a multilayer coating film can be improved, and concealment of a substrate is enhanced, thus effectively reducing the influence of the surface state (i.e., irregularities) of the substrate, which causes an impaired finished appearance; therefore, a multilayer coating film with excellent finished appearance in terms of smoothness, distinctness of image, etc., can be provided by a 3-coat 1-bake process.

The presence of the polyol in the clear coating film, not in the first colored coating film or the second colored coating film, achieves an extremely significant effect.

The polyol has hydroxy groups, which are crosslinkable functional groups, and has excellent reactivity. Thus, the polyol is also preferable from the viewpoint of coating film performance in terms of weatherability, etc. The coating film performance can be further enhanced by, for example, a preferable embodiment in which the hydroxy value of the base resin is improved.

As described above, the coating composition of the present invention enables a multilayer coating film with excellent smoothness and distinctness of image as well as excellent weatherability to be formed in a coating film-forming method that employs a 3-coat 1-bake process, since excellent concealment of the surface state (i.e., irregularities) of the substrate is imparted.

DESCRIPTION OF EMBODIMENTS

The coating composition and method for forming a coating film according to the present invention are described below in detail.

The coating composition of the present invention (which, hereafter, may be referred to as the "present coating composition") is a coating composition for use as a clear coating composition (Z) in a method for forming a multilayer coating film, the method comprising sequentially performing the following steps (1) to (4) on a substrate:

(1) applying an aqueous first colored coating composition (X) to form a first colored coating film;

(2) applying an aqueous second colored coating composition (Y) to the first colored coating film formed in step (1) to form a second colored coating film;

(3) applying a clear coating composition (Z) to the second colored coating film formed in step (2) to form a clear coating film; and (4) heat-curing the first colored coating film, the second colored coating film, and the clear coating film formed in steps (1) to (3), all at once,
the coating composition comprising a carboxy-containing compound (A), a polyepoxide (B), and a polyol (C) having a number average molecular weight of 300 to 1,500, the polyol (C) being at least one member selected from the group consisting of polyoxyalkylene-containing polyols (C1) and polycarbonate polyols (C2).

Coating Composition of the Present Invention
Carboxy-Containing Compound (A)

The carboxy-containing compound (A) contains carboxy groups in the molecule and has an acid value of typically 50 to 500 mg KOH/g, and preferably 80 to 300 mg KOH/g.

Examples of the carboxy-containing compound (A) include the following polymers (1) to (3) and compound (4). The polymers (1) to (3) and compound (4) may be used singly or in a combination.

Polymer (1): Polymer Containing Half-Esterified Acid Anhydride Groups in the Molecule The term "half-esterified acid anhydride group" as used herein means a group comprising carboxy and carboxylate groups, which is obtained by adding an aliphatic monohydric alcohol to an acid anhydride group to perform ring opening (i.e., half-esterification). Hereafter, the half-esterified acid anhydride group may be referred to simply as a "half ester group."

The polymer (1) can be easily obtained by, for example, copolymerizing a half ester group-containing unsaturated monomer with one or more other polymerizable unsaturated monomers by a usual method. The polymer (1) can also be easily obtained by carrying out copolymerization in a similar manner using an acid anhydride group-containing unsaturated monomer in place of the half ester group-containing unsaturated monomer, and then half-esterifying the acid anhydride group.

Examples of acid anhydride group-containing unsaturated monomers include maleic anhydride, itaconic anhydride, and the like. Examples of half ester group-containing unsaturated monomers include those obtained by half-esterifying acid anhydride groups of acid anhydride group-containing unsaturated monomers. As mentioned above, the half-esterification can be carried out either before or after the copolymerization reaction.

Examples of aliphatic monohydric alcohols that can be used for the half-esterification include low-molecular-weight monohydric alcohols, such as methanol, ethanol, isopropanol, n-butanol, isobutanol, tert-butanol, ethylene glycol monomethyl ether, and ethylene glycol monoethyl ether. The half-esterification can be carried out by a usual method, for example, at a temperature of room temperature to about 80° C., using, if necessary, a tertiary amine as a catalyst.

Examples of other polymerizable unsaturated monomers include hydroxy-containing unsaturated monomers, (meth)acrylic acid esters, vinyl ethers or allyl ethers, olefinic compounds and diene compounds, hydrocarbon ring-containing unsaturated monomers, nitrogen-containing unsaturated monomers, hydrolyzable alkoxysilyl group-containing acrylic monomers, and the like.

As used herein, (meth)acrylate is a general term for acrylate and methacrylate; and (meth)acrylic acid is a general term for acrylic acid and methacrylic acid.

Examples of hydroxy-containing unsaturated monomers include $C_{2-8}$ hydroxyalkyl esters of acrylic or methacrylic acid, such as 2-hydroxyethyl (meth)acrylate, 3-hydroxypropyl(meth)acrylate, and hydroxybutyl (meth)acrylate; monoesters of polyether polyols, such as polyethylene glycol, polypropylene glycol, and polybutylene glycol, with unsaturated carboxylic acids, such as (meth)acrylic acid; monoethers of polyether polyols, such as polyethylene glycol, polypropylene glycol, and polybutylene glycol, with (meth)acrylic acid hydroxyalkyl esters, such as 2-hydroxyethyl (meth)acrylate; monoesterification products or diesterification products of acid anhydride group-containing unsaturated compounds, such as maleic anhydride and itaconic anhydride, with glycols, such as ethylene glycol, 1,6-hexanediol, and neopentyl glycol; hydroxyalkyl vinyl ethers, such as hydroxyethyl vinyl ether; allyl alcohol and the like; 2-hydroxypropyl(meth)acrylate; adducts of α,β-unsaturated carboxylic acids with monoepoxy compounds, such as "Cardura E10P" (trade name; produced by Hexion Specialty Chemicals; a glycidyl ester of a synthetic highly branched saturated fatty acid) and α-olefin epoxide; adducts of glycidyl (meth)acrylate with monobasic acids, such as acetic acid, propionic acid, p-tert-butylbenzoic acid, and aliphatic acids; adducts of the above hydroxy-containing unsaturated monomers with lactones (e.g., ε-caprolactone, γ-valerolactone); and the like.

Examples of (meth)acrylic acid esters include $C_{1-24}$ alkyl esters or cycloalkyl esters of acrylic or methacrylic acid, such as methyl acrylate, ethyl acrylate, propyl acrylate, isopropyl acrylate, n-butyl acrylate, isobutyl acrylate, tert-butyl acrylate, hexyl acrylate, 2-ethylhexyl acrylate, n-octyl acrylate, decyl acrylate, lauryl acrylate, stearyl acrylate, cyclohexyl acrylate, methyl methacrylate, ethyl methacrylate, n-propyl methacrylate, isopropyl methacrylate, n-butyl methacrylate, isobutyl methacrylate, tert-butyl methacrylate, hexyl methacrylate, 2-ethylhexyl methacrylate, octyl methacrylate, decyl methacrylate, lauryl methacrylate, stearyl methacrylate, and cyclohexyl methacrylate; $C_{2-18}$ alkoxyalkyl esters of acrylic or methacrylic acid, such as methoxybutyl acrylate, methoxybutyl methacrylate, methoxyethyl acrylate, methoxyethyl methacrylate, ethoxybutyl acrylate, and ethoxybutyl methacrylate; and the like.

Examples of vinyl ethers or allyl ethers include ethyl vinyl ether, n-propyl vinyl ether, isopropyl vinyl ether, butyl vinyl ether, tert-butyl vinyl ether, pentyl vinyl ether, hexyl vinyl ether, octyl vinyl ether, and like chain-like alkyl vinyl ethers; cyclopentyl vinyl ether, cyclohexyl vinyl ether, and like cycloalkyl vinyl ethers; phenyl vinyl ether, trivinyl benzyl ether, and like aryl vinyl ethers; benzyl vinyl ether, phenethyl vinyl ether, and like aralkyl vinyl ethers; allyl ethyl ether and like allyl ethers; and the like.

Examples of olefinic compounds and diene compounds include ethylene, propylene, butylene, vinyl chloride, butadiene, isoprene, chloroprene, and the like.

Examples of hydrocarbon ring-containing unsaturated monomers include styrene, α-methylstyrene, phenyl (meth)acrylate, phenylethyl (meth)acrylate, phenylpropyl (meth)acrylate, benzyl (meth)acrylate, phenoxyethyl (meth)acrylate, cyclohexyl (meth)acrylate, 2-acryloyloxyethylhydrogen phthalate, 2-acryloyloxypropylhydrogen phthalate, 2-acryloyloxypropylhexahydrohydrogen phthalate, 2-acryloyloxypropyltetrahydrohydrogen phthalate, ester of p-tert-butyl-benzoic acid with hydroxyethyl (meth)acrylate, dicyclopentenyl (meth)acrylate, and the like.

Examples of nitrogen-containing unsaturated monomers include N,N-dimethylaminoethyl (meth)acrylate, N,N-diethylaminoethyl (meth)acrylate, N-t-butylaminoethyl (meth)acrylate, and like nitrogen-containing alkyl (meth)acrylates; acrylamide, methacrylamide, N-methyl (meth)acrylamide, N-ethyl (meth)acrylamide, N,N-dimethyl (meth)acrylamide, N,N-dimethylaminopropyl(meth)acrylamide, N,N-dimethylaminoethyl (meth)acrylamide, and like polymerizable amides; 2-vinylpyridine, 1-vinyl-2-pyrrolidone, 4-vinylpyridine, and like aromatic nitrogen-containing monomers; acrylonitrile, methacrylonitrile, and like polymerizable nitriles; allylamines; and the like.

Examples of hydrolyzable alkoxysilyl group-containing acrylic monomers include γ-(meth)acryloyloxypropyltrimethoxysilane, γ-(meth)acryloyloxypropylmethyldimethoxysilane, β-(meth)acryloyloxyethyltrimethoxysilane, γ-(meth)acryloyloxypropyltriethoxysilane, γ-(meth)acryloyloxypropylmethyldiethoxysilane, and the like.

The copolymerization of a half ester group- or acid anhydride group-containing unsaturated monomer with one or more other polymerizable unsaturated monomers can be carried out by a generally employed method for polymerization of unsaturated monomers. Considering the versatility, cost, etc., solution radical polymerization in an organic solvent is the most suitable. A desired polymer can be easily obtained by carrying out a copolymerization reaction at a temperature of about 60 to about 150° C. in a solvent in the presence of a polymerization initiator. Examples of solvents include xylene, toluene, and like aromatic solvents; methyl ethyl ketone, methyl isobutyl ketone, and like ketone solvents; ethyl acetate, butyl acetate, isobutyl acetate, 3-methoxy butyl acetate, and like ester solvents; n-butanol, isopropyl alcohol, and like alcohol solvents; and the like. Examples of polymerization initiators include azo catalysts, peroxide catalysts, and the like.

The suitable proportions of the half ester group- or acid anhydride group-containing unsaturated monomer and the one or more other polymerizable unsaturated monomers used in the copolymerization, based on the total mass of monomers used, are usually as follows: the proportion of the half ester group- or acid anhydride group-containing unsaturated monomer is within the range of generally 10 to 50 mass %, and preferably 20 to 40 mass %, in view of curability, storage stability, etc.; the proportion of the one or more other polymerizable unsaturated monomers is within the range of generally 50 to 90 mass %, and preferably 60 to 80 mass %. Among the other polymerizable unsaturated monomers, styrene is used suitably in a proportion of up to about 35 mass % in view of the weatherability of the cured coating film.

The polymer (1) is preferably an acrylic polymer having a number average molecular weight of 1,000 to 20,000, and particularly 1,500 to 15,000. If the number average molecular weight of the polymer is less than 1,000, the weatherability of the cured coating film tends to be impaired; whereas if the number average molecular weight exceeds 20,000, the compatibility with the polyepoxide tends to be reduced.

As used herein, the number average molecular weight and the weight average molecular weight are determined by measuring the retention time (retention volume) using Gel Permeation Chromatography (GPC), and converting the values into those of polystyrene using the retention time (retention volume) of the standard polystyrene, whose molecular weight is known, measured under the same conditions. More specifically, the number average molecular weight and the weight average molecular weight can be measured using an HLC8120GPC gel permeation chromatography apparatus (trade name; produced by Tosoh Corporation) together with four columns "TSKgel G-4000HXL," "TSKgel G-3000HXL," "TSKgel G-2500HXL," and "TSKgel G-2000HXL" (trade names; all produced by Tosoh Corporation), and a differential refractometer as a detector under the following conditions: mobile phase, tetrahydrofuran; measurement temperature, 40° C.; and flow rate, 1 mL/min.

Polymer (2): Polymer Containing Carboxy Groups in the Molecule

The polymer (2) can be easily obtained by copolymerizing a carboxy-containing unsaturated monomer with one or more other polymerizable unsaturated monomers in the same manner as in the polymer (1).

Examples of carboxy-containing unsaturated monomers include acrylic acid, methacrylic acid, crotonic acid, itaconic acid, maleic acid, fumaric acid, 2-carboxyethyl (meth)acrylate, 3-carboxypropyl(meth)acrylate, 5-carboxypentyl (meth)acrylate, and the like. Examples of other polymerizable unsaturated monomers include those mentioned in the description of the polymer (1), such as (meth)acrylic acid esters, vinyl ethers or allyl ethers, olefinic compounds and diene compounds, hydrocarbon ring-containing unsaturated monomers, and nitrogen-containing unsaturated monomers.

The polymer (2) has a number average molecular weight of typically 1,000 to 20,000, and particularly preferably 1,500 to 15,000, from the viewpoint of the weatherability of the cured coating film, compatibility with the polyepoxide (B), etc.

Polymer (3): Carboxy-Containing Polyester Polymer

The carboxy-containing polyester polymer can be easily obtained by a condensation reaction of a polyhydric alcohol with a polycarboxylic acid. Examples of polyhydric alcohols include ethylene glycol, butylene glycol, 1,6-hexanediol, trimethylolpropane, pentaerythritol, and the like. Examples of polycarboxylic acids include adipic acid, terephthalic acid, isophthalic acid, phthalic anhydride, hexahydrophthalic anhydride, and the like. For example, the carboxy-containing polyester polymer can be obtained by a one-step reaction under such conditions that carboxy groups of the polycarboxylic acid are present in excess. Alternatively, the carboxy-containing polyester polymer can be obtained by first synthesizing a hydroxy-terminated polyester polymer under such conditions that hydroxy groups of the polyhydric alcohol are present in excess, and thereafter adding an acid anhydride group-containing compound, such as phthalic anhydride, hexahydrophthalic anhydride, or succinic anhydride.

The carboxy-containing polyester polymer (3) has a number average molecular weight of typically 500 to 20,000, and particularly preferably 800 to 10,000.

Compound (4): Half Ester Formed by a Reaction of a Polyol and a 1,2-Acid Anhydride The half ester can be obtained by reacting a polyol with a 1,2-acid anhydride under such conditions that a ring-opening reaction of the acid anhydride occurs, but a polyesterification reaction does not substantially occur. The resulting reaction product generally has a low molecular weight and narrow molecular weight distribution. Further, the reaction product has a low volatile organic content when contained in a coating composition and imparts excellent acid resistance and other properties to the resulting coating film.

The half ester can be obtained by, for example, reacting a polyol and a 1,2-acid anhydride in an inert atmosphere, such as a nitrogen atmosphere, in the presence of a solvent. Examples of preferred solvents include ketones, such as methyl amyl ketone, diisobutyl ketone, and methyl isobutyl ketone; aromatic hydrocarbons, such as toluene and xylene; and other organic solvents, such as dimethylformamide, and N-methylpyrrolidone.

The reaction is carried out preferably at a low temperature of about 150° C. or less. More specifically, it is preferred that the reaction temperature be typically about 70 to about 150° C., and particularly preferably about 90 to about 120° C. Basically, the reaction time slightly varies depending on the reaction temperature, but is typically about 10 minutes to about 24 hours.

The ratio of the acid anhydride/polyol in the reaction is such that the equivalent ratio of the acid anhydride/polyol is 0.8/1 to 1.2/1, when calculating the acid anhydride as a monofunctional compound. Thereby, the desired half ester can be obtained in the maximum yield.

The acid anhydride for use in the preparation of the desired half ester has 2 to 30 carbon atoms excluding the carbon atoms in the acid moiety. Examples of such acid anhydrides include aliphatic acid anhydrides, alicyclic acid anhydrides, olefin acid anhydrides, cyclic olefin acid anhydrides, and aromatic acid anhydrides. These acid anhydrides may have one or more substituents insofar as the substituents do not adversely affect the reactivity of the acid anhydride or the properties of the resulting half ester. Examples of such substituents include chloro, alkyl, alkoxy, and the like. Examples of acid anhydrides include succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, alkylhexahydrophthalic anhydride (such as methylhexahydrophthalic anhydride), tetrafluorophthalic anhydride, endomethylenetetrahydrophthalic anhydride, chlorendic anhydride, itaconic anhydride, citraconic anhydride, maleic anhydride, and the like.

Examples of polyols usable in the half-esterification of the acid anhydride include those having 2 to 20 carbon atoms, and particularly 2 to 10 carbon atoms. Preferable examples include diols, triols, and mixtures thereof. Specific examples include aliphatic polyols, such as ethylene glycol, 1,2-propanediol, 1,3-propanediol, 1,4-butanediol, 1,5-pentanediol, glycerol, 1,2,3-butane triol, 1,6-hexanediol, neopentyl glycol, diethylene glycol, dipropylene glycol, 1,4-cyclohexane dimethanol, 3-methyl-1,5-pentanediol, trimethylolpropane, 2,2,4-trimethylpentane-1,3-diol, pentaerythritol, and 1,2,3,4-butanetetraol. Aromatic polyols, such as bisphenol A and bis (hydroxymethyl)xylene are also usable.

The half ester has a number average molecular weight of typically 400 to 1,000, and particularly 500 to 900. The half ester has high reactivity with epoxy and thus is useful in the preparation of coating compositions with a high solids content.

In an embodiment, the carboxy-containing compound (A) is a polymer obtained by adding an aliphatic monohydric alcohol to a monomer mixture containing maleic anhydride or itaconic anhydride, and one or more other polymerizable unsaturated monomers selected from the group consisting of hydroxy-containing unsaturated monomers, (meth)acrylic acid esters, vinyl ethers, allyl ethers, olefinic compounds, diene compounds, hydrocarbon ring-containing unsaturated monomers, nitrogen-containing unsaturated monomers, and hydrolyzable alkoxysilyl group-containing acrylic monomers. In a preferable embodiment, the one or more other polymerizable unsaturated monomers comprises a (meth)acrylic acid ester and a hydrocarbon ring-containing unsaturated monomer (in particular, styrene).

Polyepoxide (B)

The polyepoxide (B) used in combination with the above-mentioned carboxy-containing compound (A) is a compound containing epoxy groups in the molecule. The polyepoxide (B) is preferably a compound in which the epoxy group content is in the range of typically 0.8 to 10 mmol/g, and particularly 1.2 to 5.0 mmol/g.

Examples of the polyepoxide (B) include epoxy-containing acrylic polymers; diglycidyl ether, 2-glycidylphenyl glycidyl ether, 2,6-diglycidylphenyl glycidyl ether and like glycidyl ether compounds; vinylcyclohexene dioxide, limonene dioxide and like glycidyl- or alicyclic epoxy-containing compounds; dicyclopentadiene dioxide, bis(2,3-epoxycyclopentyl)ether, epoxycyclohexenecarboxylic acid ethylene glycol diester, bis(3,4-epoxycyclohexyl methyl) adipate, 3,4-epoxycyclohexylmethyl-3,4-epoxycyclohexanecarboxylate, 3,4-epoxy-6-methylcyclohexylmethyl-3,4-epoxy-6-methylcyclohexane carboxylate and like alicyclic epoxy-containing compounds; and the like. These may be used singly or in a combination of two or more.

Of these, epoxy-containing acrylic polymers can be preferably used.

Such an epoxy-containing acrylic polymer has a number average molecular weight of preferably 1,000 to 20,000, and particularly preferably 1,500 to 15,000, from the viewpoint of coating film performance and finished appearance.

The epoxy-containing acrylic polymer can be easily obtained by copolymerizing an epoxy-containing unsaturated monomer and one or more other polymerizable unsaturated monomers in the same manner as in the polymer (1).

Examples of epoxy-containing unsaturated monomers include glycidyl (meth)acrylate, allyl glycidyl ether and like aliphatic epoxy-containing unsaturated monomers, and 3,4-epoxycyclohexylmethyl (meth)acrylate and like alicyclic epoxy-containing unsaturated monomers.

Examples of other polymerizable unsaturated monomers include those mentioned in the description of the polymer (1), such as hydroxy-containing unsaturated monomers, (meth)acrylic acid esters, vinyl ethers or allyl ethers, olefinic compounds and diene compounds, hydrocarbon ring-containing unsaturated monomers, nitrogen-containing unsaturated monomers, and hydrolyzable alkoxysilyl group-containing acrylic monomers.

Of these monomers, hydroxy-containing unsaturated monomers are preferable from the viewpoint of coating film performance in terms of the weatherability, etc., of the clear coating film.

When the epoxy-containing acrylic polymer contains hydroxy groups, the hydroxy value is preferably 50 to 200 mg KOH/g, particularly preferably 80 to 150 mg KOH/g, and further particularly preferably 100 to 140 mg KOH/g, to achieve excellent coating film performance in terms of weatherability, etc., in addition to an excellent finished appearance of the clear coating film.

From the viewpoint of the curability, etc., of the coating film, the ratio of the carboxy-containing compound (A) and polyepoxide (B) in the present coating composition is preferably such that the equivalent ratio of carboxy groups in the carboxy-containing compound (A) to epoxy groups in the polyepoxide (B) is generally 1/0.5 to 0.5/1, particularly 1/0.7 to 0.7/1, and further particularly 1/0.8 to 0.8/1.

Polyol (C)

The polyol (C) is at least one member selected from the group consisting of polyoxyalkylene-containing polyols (C1) and polycarbonate polyols (C2).

To achieve an excellent finished appearance in terms of smoothness and distinctness of image, and excellent coating film performance in terms of weatherability, etc., the polyol (C) has a number average molecular weight of 300 to 1,500, preferably 350 to 1,000, and more preferably 400 to 800.

In addition, to achieve an excellent finished appearance in terms of smoothness and distinctness of image, and excellent coating film performance in terms of weatherability, etc., the polyol (C) has a hydroxy value of preferably 60 to 400 mg KOH/g, more preferably 100 to 350 mg KOH/g, and particularly preferably 150 to 300 mg KOH/g.

Examples of polyoxyalkylene-containing polyols (C1) include compounds obtained by adding an alkylene oxide to an active hydrogen-containing compound, such as a polyhydric alcohol, a polyhydric phenol, or a polycarboxylic acid. Examples of active hydrogen-containing compounds include water, polyhydric alcohols (ethylene glycol, diethylene glycol, trimethylene glycol, propylene glycol, 1,4-butanediol, 1,6-hexanediol, neopentyl glycol, 1,4-dihydroxymethylcyclohexane, cyclohexylene glycol, and like dihydric alcohols; glycerin, trioxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerin, pentaglycerin, 1,2,4-butanetriol, 1,2,4-pentanetriol, trimethylolethane, trimethylolpropane, and like trihydric alcohols; pentaerythritol, 1,2,3,4-pentanetetrol, 2,3,4,5-hexanetetrol, 1,2,4,5-pentanetetrol, 1,3,4,5-hexanetetrol, diglycerin, sorbitan, and like tetrahydric alcohols; adonitol, arabitol, xylitol, triglycerin, and like pentahydric alcohols; dipentaerythritol, sorbitol, mannitol, iditol, inositol, dulcitol, talose, allose, and like hexahydric alcohols; sucrose and like octahydric alcohols; polyglycerin, and the like); polyhydric phenols [polyhydric phenols (pyrogallol, hydroquinone, phloroglucin, and the like), bisphenols (bisphenol A, bisphenol sulfone, and the like)]; polycarboxylic acids [aliphatic polycarboxylic acids (succinic acid, adipic acid, and the like), aromatic polycarboxylic acids (phthalic acid, terephthalic acid, trimellitic acid, and the like)]; and the like.

Among these, from the viewpoint of reactivity, polyhydric alcohols are preferable as active hydrogen-containing compounds. In particular, the active hydrogen-containing compound is preferably a polyhydric alcohol containing an alkylene group having 3 or more carbon atoms, and particularly preferably a polyhydric alcohol containing an alkylene group having 3 or 4 carbon atoms.

Further, among polyhydric alcohols, dihydric alcohols are particularly preferable in view of the smoothness and distinctness of image of the resulting multilayer coating film.

In particular, among the above-described polyhydric alcohols, ethylene glycol, diethylene glycol, trimethylene glycol, propylene glycol, and 1,4-butanediol are preferable, and trimethylene glycol, propylene glycol, and 1,4-butanediol are particularly preferable.

The polyoxyalkylene-containing polyols (C1) can be typically obtained by performing an addition reaction of an alkylene oxide to the active hydrogen-containing compound in the presence of an alkali catalyst at a temperature of 60 to 160° C. at ordinary pressure or under increased pressure by a usual method. Examples of alkylene oxides include ethylene oxide, propylene oxide, butylene oxide, and like alkylene oxides. Among these, propylene oxide and butylene oxide can be preferably used, and propylene oxide can be particularly preferably used. These may be used singly or in a combination of two or more. If two or more of them are used in combination, the addition may be performed block-wise or randomly.

As the polyoxyalkylene-containing polyols (C1), polyoxyalkylene glycols can be preferably used.

As the polyoxyalkylene glycols, commercially available products are usable. Examples thereof include, as polyethylene glycol, #300, #400, and #600 (all produced by Dai-ichi Kogyo Seiyaku Co., Ltd.); as polypropylene glycol, Hyprox MP-600 (produced by Dainippon Ink and Chemicals), Primepol PX-1000, Sannix SP-750, Sannix PP-400, Sannix PP-600, and Sannix PP-1000 (all produced by Sanyo Chemical Industries, Ltd.), Diol-400, Diol-700, and Diol-1000 (all produced by Mitsui Chemicals, Inc.); as polytetramethylene glycol, PTMG-650, PTMG-850, and PTMG-1000 (all produced by Mitsubishi Chemical Corporation); and the like.

Examples of usable polycarbonate polyols (C2) include commonly used compounds having 1,6-hexanediol as a basic skeleton, and polycarbonate polyols produced by known methods. Examples thereof include polycarbonate polyols obtained by reacting a carbonate component, such as alkylene carbonate, diaryl carbonate, or dialkyl carbonate, or phosgene with the aliphatic polyol component described below. Examples of the aliphatic polyol component include 1,3-propanediol, 1,4-butanediol, 1,6-hexanediol, and like linear glycols; 1,2-propanediol, neopentyl glycol, 3-methyl-1,5-pentanediol, ethylbutylpropanediol, and like branched glycols; diethylene glycol, triethylene glycol, and like ether diols.

The polycarbonate polyols (C2) are preferably those that have no ring structures, such as an aromatic ring or an aliphatic ring, in their molecular structure, from the viewpoint of thermal flowability during heat-curing.

As the polycarbonate polyols, commercially available products are usable. Examples thereof include UH-50, UH-100, and UM-90 (⅓) (all produced by Ube Industries, Ltd.); C-1100 and C-XP-2716 (both produced by Bayer); and the like.

The polyol (C) is used in an amount of preferably 1 to 20 mass %, particularly preferably 2 to 10 mass %, and further particularly preferably 3 to 7 mass % based on the total solids content of the carboxy-containing compound (A) and the polyepoxide (B).

Use of the polyol (C) in the above-mentioned ranges improves thermal flowability in the curing process for a multilayer coating film, thus enabling sufficient concealment of the surface state (irregularities) of a substrate. This suppresses the influence of the surface state of a substrate, thereby obtaining a multilayer coating film with excellent finished appearance in terms of smoothness and distinctness of image, as well as excellent coating film performance in terms of weatherability, etc.

The present coating composition may comprise a curing catalyst, if necessary. Examples of usable curing catalysts include those that are effective for the ring-opening esterification reaction between carboxy groups in the carboxy-containing compound (A) and epoxy groups in the polyepoxide (B). Examples include tetraethylammonium bromide, tetrabutylammonium bromide, tetraethylammonium chloride, tetrabutylphosphonium bromide, triphenylbenzylphosphonium chloride, and like quaternary salt catalysts; mixtures of substantially equivalent amounts of a quaternary salt and an acidic phosphoric acid compound, such as dibutyl phosphoric acid; triethylamine, tributylamine, and like amine compounds; and the like. Among these, quaternary salt catalysts and mixtures of substantially equivalent amounts of a quaternary salt and an acidic phosphoric acid compound, such as dibutyl phosphoric acid are preferable. Mixtures of substantially equivalent amounts of a quaternary salt and an acidic phosphoric acid compound, such as dibutyl phosphoric acid, are particularly preferable, because such mixtures improve the storage stability of the coating composition and prevent the decrease in spray coating suitability caused by the reduction in the electrical resistance of the coating composition, while retaining the catalytic action.

When a curing catalyst is used, it is preferable that the amount of the curing catalyst be typically about 0.01 to about 5 mass % based on the total solids content of the carboxy-containing compound (A) and the polyepoxide (B).

In addition, the present coating composition may comprise, if necessary, a color pigment, an effect pigment, a dye, etc., in such amounts that the transparency of the coating composition is not impaired, and may further comprise an extender pigment, a UV absorber, an antifoaming agent, a thickener, an anticorrosive, a surface control agent, an organic solvent, etc.

The present coating composition generally has a solids concentration of preferably 45 to 60 mass %, more preferably 50 to 60 mass %, and even more preferably 50 to 55 mass %.

The total concentration of the carboxy-containing compound (A) and the polyepoxide (B) in the coating composition is generally preferably 30 to 58 mass %, and more preferably 40 to 58 mass %.

The present coating composition may be applied by a known method, such as airless spray coating, air spray coating, or rotary atomization coating. An electrostatic charge may be applied during coating. It is usually preferable that the coating film thickness be 10 to 60 μm, and more preferably 25 to 50 μm, when cured.

Method for Forming a Multilayer Coating Film

Substrate

The substrate to which an aqueous first colored coating composition (X) can be applied according to the present invention is not particularly limited. Examples of substrates include exterior panel parts of automotive bodies, such as passenger cars, trucks, motorcycles, and buses; automotive components; exterior panel parts of household electrical appliances, such as cellular phones and audiovisual apparatus; and the like. Among these, exterior panel parts of automotive bodies and automotive components are preferable.

The materials for such substrates are not particularly limited. Examples thereof include metallic materials, such as iron, aluminum, brass, copper, tin plate, stainless steel, galvanized steel, and steel plated with zinc alloy (Zn—Al, Zn—Ni, Zn—Fe, etc.); plastic materials, such as polyethylene resin, polypropylene resin, acrylonitrile-butadiene-styrene (ABS) resin, polyamide resin, acrylic resin, vinylidene chloride resin, polycarbonate resin, polyurethane resin, epoxy resin, and like resins, and various types of FRP; inorganic materials, such as glass, cement, and concrete; wood; textile materials, such as paper and cloth; and the like. Among these, metallic materials and plastic materials are preferable.

The substrate may be a metallic material as described above or one formed therefrom, such as a vehicle body, whose metallic surface has been subjected to a surface treatment, such as phosphate treatment, chromate treatment, or composite oxide treatment. Further, the substrate may also be a metallic material, vehicle body, or the like as described above, on which an undercoating film of various electrodeposition coating compositions has been formed. Among these, vehicle bodies on which an undercoating film has been formed using a cationic electrodeposition coating composition are particularly preferable.

Step (1)

In this step, an aqueous first colored coating composition (X) is applied to a substrate to form a first colored coating film.

Aqueous First Colored Coating Composition (X)

The aqueous first colored coating composition (X) that is applied to the substrate may be an aqueous liquid coating composition comprising a thermosetting resin component and water, and comprising, if necessary, an organic solvent, a color pigment, an extender pigment, an effect pigment, a surface control agent, an antisettling agent, etc. In the present specification, aqueous coating compositions refer to coating compositions that contain water as a main component of the solvent.

The thermosetting resin component may be a known coating resin composition comprising a base resin (I) and a crosslinking agent (II). Examples of the base resin (I) include polyester resins, acrylic resins, vinyl resins, alkyd resins, and urethane resins. Such base resins have crosslinkable functional groups such as hydroxy and hydrophilic functional groups such as carboxy. Examples of the crosslinking agent (II) include melamine resins and blocked or unblocked polyisocyanate compounds.

Among these, it is preferable to use a hydroxy-containing acrylic resin (I-1) and/or a hydroxy-containing polyester resin (I-2) as the base resin (I), and to use an amino resin (II-1) and/or a blocked polyisocyanate compound (II-2) as the crosslinking agent (II).

The hydroxy-containing acrylic resin (I-1) can be produced by, for example, (co)polymerizing at least one unsaturated monomer component containing a hydroxy-containing unsaturated monomer and further containing, optionally, one or more other unsaturated monomers copolymerizable with the hydroxy-containing unsaturated monomer, under usual conditions.

The hydroxy-containing unsaturated monomer is a compound having at least one hydroxy group and at least one polymerizable unsaturated bond per molecule. Examples thereof include monoesterified products of (meth)acrylic acid with a dihydric alcohol having 2 to 8 carbon atoms, such as 2-hydroxyethyl (meth)acrylate, 2-hydroxypropyl (meth)acrylate, 3-hydroxypropyl(meth)acrylate, and 4-hydroxybutyl(meth)acrylate; ε-caprolactone-modified products of monoesterified products of (meth)acrylic acid with a dihydric alcohol having 2 to 8 carbon atoms; allyl alcohol; (meth)acrylates having hydroxy-terminated polyoxyethylene chains; and the like.

Examples of other unsaturated monomers copolymerizable with the hydroxy-containing unsaturated monomer include alkyl or cycloalkyl (meth)acrylate, such as methyl (meth)acrylate, ethyl (meth)acrylate, n-propyl(meth)acrylate, 1-propyl(meth)acrylate, n-butyl (meth)acrylate, i-butyl (meth)acrylate, tert-butyl (meth)acrylate, n-hexyl(meth)acrylate, octyl (meth)acrylate, 2-ethylhexyl(meth)acrylate, nonyl (meth)acrylate, lauryl (meth)acrylate, tridecyl (meth)acrylate, stearyl (meth)acrylate, "Isostearyl Acrylate" (trade name, produced by Osaka Organic Chemical Industry Ltd.), cyclohexyl (meth)acrylate, methylcyclohexyl (meth)acrylate, t-butylcyclohexyl(meth)acrylate, and cyclododecyl (meth)acrylate; isobornyl-containing unsaturated monomers, such as isobornyl (meth)acrylate; adamantyl-containing unsaturated monomers, such as adamantyl (meth)acrylate; aromatic ring-containing unsaturated monomers, such as styrene, α-methylstyrene, vinyltoluene, and phenyl (meth)acrylate; alkoxysilyl-containing unsaturated monomers, such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane; perfluoroalkyl (meth)acrylates, such as perfluorobutylethyl (meth)acrylate and perfluorooctylethyl (meth)acrylate; fluorinated alkyl-containing unsaturated monomers, such as fluoroolefin; unsaturated monomers having photopolymerizable functional groups, such as maleimide; vinyl compounds, such as N-vinylpyrrolidone, ethylene, butadiene, chloroprene, vinyl propionate, and vinyl acetate; carboxy-containing unsaturated monomers, such as (meth)acrylic acid, maleic acid, crotonic acid, and β-carboxyethyl acrylate; nitrogen-containing unsaturated monomers, such as (meth)acrylonitrile, (meth)acrylamide, dimethylaminopropyl (meth)acrylamide, dimethylaminoethyl (meth)acrylate, and adducts of glycidyl (meth)acrylate with amines; epoxy-containing unsaturated monomers, such as glycidyl (meth)acrylate, β-methylglycidyl(meth)acrylate, 3,4-epoxycyclohexylmethyl (meth)acrylate, 3,4-epoxycyclohexylethyl (meth)acrylate, 3,4-epoxycyclohexylpropyl(meth)acrylate, and allyl glycidyl ether; (meth)acrylates having alkoxy-terminated polyoxyethylene chains; sulfonic acid group-containing unsaturated monomers, such as 2-acrylamide-2-methylpropanesulfonic acid, allylsulfonic acid, styrene sulfonic acid sodium salt, sulfoethyl methacrylate, and sodium salts and ammonium salts thereof; phosphoric acid group-containing unsaturated monomers, such as 2-acryloyloxyethyl acid phosphate, 2-methacryloyloxyethyl acid phosphate, 2-acryloyloxypropyl acid phosphate, and 2-methacryloyloxypropyl acid phosphate; UV-absorbing group-containing unsaturated monomers, such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole; unsaturated monomers having UV stabilization properties, such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine; carbonyl-containing unsaturated monomer compounds, such as acrolein, diacetone acrylamide, diacetone methacrylamide, acetoacetoxyethyl methacrylate, formylstyrol, and $C_{4-7}$ vinyl alkyl ketones (e.g., vinyl methyl ketone, vinyl ethyl ketone, and vinyl butyl ketone); and the like. These may be used singly or in a combination of two or more.

In view of storage stability, water resistance of the resulting coating film, etc., the hydroxy-containing acrylic resin (I-1) may have a hydroxy value of typically 1 to 200 mg KOH/g, preferably 2 to 100 mg KOH/g, and even more preferably 3 to 60 mg KOH/g, and an acid value of typically 1 to 200 mg KOH/g, preferably 2 to 150 mg KOH/g, and more preferably 5 to 100 mg KOH/g. In addition, the hydroxy-containing acrylic resin (I-1) may have a weight average molecular weight of typically 1,000 to 5,000,000, preferably 2,000 to 3,000,000, and more preferably 3,000 to 1,000,000.

The amount of the hydroxy-containing acrylic resin (I-1) can be typically 0 to 90 mass %, preferably 5 to 60 mass %, and more preferably 10 to 40 mass %, based on the total solids content of the base resin (I) and the crosslinking agent (II) (hereafter, referred to collectively as resin component) in the aqueous first colored coating composition (X).

The hydroxy-containing polyester resin (I-2) can be produced by, for example, an esterification reaction or transesterification reaction of a polybasic acid component with a polyhydric alcohol component. More specifically, for example, the hydroxy-containing polyester resin (I-2) can be produced by performing an esterification reaction under such conditions that the equivalent ratio of carboxy groups in the polybasic acid component to hydroxy groups in the polyhydric alcohol (COOH/OH) is less than 1, i.e., in a state where more hydroxy groups are present than carboxy groups.

The polybasic acid component is a compound having at least two carboxy groups per molecule. Examples thereof include polybasic acids, such as phthalic acid, isophthalic acid, terephthalic acid, succinic acid, glutaric acid, adipic acid, azelaic acid, sebacic acid, tetrahydrophthalic acid, hexahydrophthalic acid, maleic acid, fumaric acid, itaconic acid, trimellitic acid, and pyromellitic acid; anhydrides of these polybasic acids; lower alkyl esters of these polybasic acids; and the like. These may be used singly or in a combination of two or more.

The polyhydric alcohol component is a compound having at least two hydroxy groups per molecule. Examples thereof include α-glycols, such as ethylene glycol, 1,2-propylene glycol, 1,2-butylene glycol, 2,3-butylene glycol, 1,2-hexanediol, 1,2-dihydroxycyclohexane, 3-ethoxypropane-1,2-diol, and 3-phenoxypropane-1,2-diol; neopentyl glycol, 2-methyl-1,3-propanediol, 2-methyl-2,4-pentanediol, 3-methyl-1,3-butanediol, 2-ethyl-1,3-hexanediol, 2,2-diethyl-1,3-propanediol, 2,2,4-trimethyl-1,3-pentanediol, 2-butyl-2-ethyl-1,3-propanediol, 2-phenoxypropane-1,3-diol, 2-methyl-2-phenylpropane-1,3-diol, 1,3-propylene glycol, 1,3-butylene glycol, 2-ethyl-1,3-octanediol, 1,3-dihydroxycyclohexane, 1,4-butanediol, 1,4-dihydroxycyclohexane, 1,5-pentanediol, 1,6-hexanediol, 2,5-hexanediol, 3-methyl-1,5-pentanediol, 1,4-dimethylolcyclohexane, tricyclodecanedimethanol, 2,2-dimethyl-3-hydroxypropyl-2,2-dimethyl-3-hydroxypropionate (ester of hydroxypivalic acid with neopentyl glycol), bisphenol A, bisphenol F, bis(4-hydroxyhexyl)-2,2-propane, bis(4-hydroxyhexyl)methane, 3,9-bis(1,1-dimethyl-2-hydroxyethyl)-2,4,8,10- tetraoxaspiro[5,5]undecane, diethylene glycol, triethylene glycol, glycerin, diglycerin, triglycerin, pentaerythritol, dipentaerythritol, sorbitol, mannitol, trimethylolethane, trimethylolpropane, ditrimethylolpropane, tris(2-hydroxyethyl)isocyanurate, and the like. These may be used singly or in a combination of two or more.

The esterification or transesterification reaction of the polybasic acid component with the polyhydric alcohol component can be performed by a known method, for example, by polycondensation of the polybasic acid component with the polyhydric alcohol component at a temperature of about 180 to about 250° C.

In addition, the hydroxy-containing polyester resin (I-2) can be modified with a fatty acid, a monoepoxy compound, or the like, during the preparation of the polyester resin or after the esterification reaction, if necessary. Examples of fatty acids include coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and the like. Examples of monoepoxy compounds include "Cardura E10P" (trade name, produced by HEXION Specialty Chemicals; glycidyl ester of a synthetic highly branched saturated fatty acid), and the like.

The hydroxy-containing polyester resin (I-2) may have a hydroxy value of typically 10 to 300 mg KOH/g, preferably 25 to 250 mg KOH/g, and more preferably 50 to 200 mg KOH/g, and an acid value of typically 1 to 200 mg KOH/g, preferably 5 to 100 mg KOH/g, and more preferably 10 to 60 mg KOH/g. In addition, the hydroxy-containing polyester resin (I-2) may have a weight average molecular weight of typically 500 to 50,000, preferably 1,000 to 40,000, and more preferably 1,500 to 30,000.

The amount of the hydroxy-containing polyester resin (I-2) can be generally 0 to 90 mass %, preferably 10 to 60 mass %, and more preferably 15 to 50 mass %, based on the total solids content of the resin component in the aqueous first colored coating composition (X).

With respect to the hydroxy-containing acrylic resin (I-1) and hydroxy-containing polyester resin (I-2), it is preferable that some or all of the carboxy groups that may be contained therein be neutralized with a basic compound, to facilitate dissolution or dispersion thereof in water. Examples of basic compounds include hydroxides of alkali metals or alkaline earth metals, such as sodium hydroxide, potassium hydroxide, lithium hydroxide, calcium hydroxide, and barium hydroxide; ammonia; primary monoamines, such as ethylamine, propylamine, butylamine, benzylamine, monoethanolamine, neopentanolamine, 2-aminopropanol, 2-amino-2-methyl-1-propanol, and 3-aminopropanol; secondary monoamines, such as diethylamine, diethanolamine, di-n-propanolamine, diisopropanolamine, N-methylethanolamine, and N-ethylethanolamine; tertiary monoamines, such as dimethylethanolamine, trimethylamine, triethylamine, triisopropylamine, methyldiethanolamine, and 2-(dimethylamino)ethanol; polyamines, such as diethylenetriamine, hydroxyethylaminoethylamine, ethylaminoethylamine, and methylaminopropylamine; and the like. The amount of the basic compound is typically 0.1 to 1.5 equivalents, and preferably 0.2 to 1.2 equivalents, relative to the acid groups of the base resin (I).

Examples of urethane resins include, in addition to general urethane resins, those in which polyisocyanate compounds are extended to higher molecular weight by urethanization reactions with some of the hydroxy groups in the hydroxy-containing acrylic resin (I-1) and the hydroxy-containing polyester resin (I-2).

Examples of the amino resin (II-1) include partially or fully methylolated amino resins obtained by reacting amino components with aldehydes. Examples of amino components include melamine, urea, benzoguanamine, acetoguanamine, steroguanamine, spiroguanamine, dicyandiamide, and the like. Examples of aldehydes include formaldehyde, paraformaldehyde, acetaldehyde, benzaldehyde, and the like. Those obtained by partially or fully etherifying the partially or fully methylolated amino resins with alcohols are also usable. Examples of alcohols used for etherification include methyl alcohol, ethyl alcohol, n-propyl alcohol, i-propyl alcohol, n-butyl alcohol, i-butyl alcohol, 2-ethylbutanol, 2-ethylhexanol, and the like.

The amino resin (II-1) is preferably a melamine resin. In particular, a methyl-etherified melamine resin obtained by etherifying some or all of the methylol groups of a partially or fully methylolated melamine resin with methyl alcohol; a butyl-etherified melamine resin obtained by etherifying some or all of the methylol groups of a partially or fully methylolated melamine resin with butyl alcohol; a methyl-butyl-etherified melamine resin obtained by etherifying some or all of the methylol groups of a partially or fully methylolated melamine resin with methyl alcohol and butyl alcohol; and like alkyl-etherified melamine resins are preferable.

The melamine resin has a weight average molecular weight of typically 500 to 5,000, more preferably 600 to 4,000, and even more preferably 700 to 3,000.

When a melamine resin is used as the crosslinking agent (II), sulfonic acids, such as p-toluenesulfonic acid, dodecylbenzenesulfonic acid, and dinonylnaphthalene sulfonic acid, and salts of these acids with amine may be used as a catalyst.

The blocked polyisocyanate compound (II-2) is a polyisocyanate compound having at least two isocyanate groups per molecule, and is obtained by blocking isocyanate groups of the polyisocyanate compound with a blocking agent, such as an oxime, a phenol, an alcohol, an active methylene compound, a lactam, or a mercaptan.

The ratio of the base resin (I) and the crosslinking agent (II) is preferably such that based on the total solids content of the base resin (I) and the crosslinking agent (II), the proportion of the base resin (I) is typically 40 to 90 mass %, and particularly 50 to 80 mass %, and the proportion of the crosslinking agent (II) is typically 60 to 10 mass %, and particularly 50 to 20 mass %.

Examples of color pigments include titanium oxide, zinc oxide, carbon black, lead sulfate, calcium plumbate, zinc phosphate, aluminum phosphate, zinc molybdate, calcium molybdate, berlin blue, ultramarine blue, cobalt blue, copper phthalocyanine blue, indanthrone blue, chrome yellow, synthetic yellow iron oxide, transparent iron oxide red (yellow), bismuth vanadate, titanium yellow, zinc yellow, monoazo yellow, isoindolinone yellow, metallic complex azo yellow, quinophthalone yellow, benzimidazolone yellow, iron oxide red, minium, monoazo red, quinacridone red, azo-lake (Mn salt), quinacridone magenta, anthanthrone orange, dianthraquinonyl red, perylene maroon, quinacridone magenta, perylene red, diketo pyrrolo-pyrrole chrome vermilion, chlorination phthalocyanine green, bromination phthalocyanine green, pyrazolone orange, benzimidazolone orange, dioxazine violet, perylene violet, and the like. Among these, titanium oxide and carbon black can be preferably used.

When the aqueous first colored coating composition (X) comprises a color pigment as described above, the amount of the color pigment is typically 1 to 120 mass %, preferably 10 to 100 mass %, and more preferably 15 to 90 mass %, based on the total solids content of the resin component in the aqueous first colored coating composition (X).

Examples of extender pigments include clay, kaolin, barium sulfate, barium carbonate, calcium carbonate, talc, silica, alumina white, and the like. Of these, barium sulfate and/or talc is preferably used.

When the aqueous first colored coating composition (X) comprises an extender pigment as described above, the amount of the extender pigment is typically 1 to 100 mass %, preferably 5 to 60 mass, and more preferably 8 to 40 mass %, based on the total solids content of the resin component in the aqueous first colored coating composition (X).

Examples of effect pigments include non-leafing or leafing aluminum (including vapor-deposited aluminum), copper, zinc, brass, nickel, aluminum oxide, mica, titanium oxide- or iron oxide-coated aluminum oxide, titanium oxide- or iron oxide-coated mica, glass flakes, holographic pigments, and the like. These may be used singly or in a combination of two or more.

When the aqueous first colored coating composition (X) comprises an effect pigment as described above, the amount of the effect pigment is typically 1 to 50 mass %, preferably 2 to 30 mass %, and more preferably 3 to 20 mass %, based on the total solids content of the resin component in the aqueous first colored coating composition (X).

The aqueous first colored coating composition (X) can be applied to the substrate by a known method, such as air spray coating, airless spray coating, or rotary atomization coating. An electrostatic charge may be applied during the coating. It is usually preferable that the coating film thickness be 10 to 100 μm, more preferably 10 to 50 μm, and even more preferably 15 to 35 μm, when cured.

Step (2)

An aqueous second colored coating composition (Y) is then applied to the first colored coating film formed using the aqueous first colored coating composition in step (1).

Aqueous Second Colored Coating Composition (Y)

The aqueous second colored coating composition (Y) used in the present invention may be an aqueous liquid coating composition comprising a thermosetting resin component and water, and comprises, if necessary, an organic solvent, a color pigment, an extender pigment, an effect pigment, a surface control agent, an antisettling agent, etc.

The thermosetting resin component may be a known coating resin composition as mentioned in the description of the aqueous first colored coating composition (X), i.e., a coating resin composition comprising a base resin (I) and a crosslinking agent (II). Examples of the base resin (I) include polyester resins, acrylic resins, vinyl resins, alkyd resins, and urethane resins. Such base resins have crosslinkable functional groups, such as hydroxy, and hydrophilic functional groups, such as carboxy. Examples of the crosslinking agent (II) include melamine resins and blocked or unblocked polyisocyanate compounds.

Among these, it is preferable to use the aforementioned hydroxy-containing acrylic resin (I-1) and/or hydroxy-containing polyester resin (I-2) as the base resin (I), and to use the amino resin (II-1) and/or blocked polyisocyanate compound (II-2) as the crosslinking agent (II).

If necessary, the aqueous second colored coating composition (Y) may further contain pigments as described above, such as color pigments, extender pigments, and effect pigments; and additives generally used for coating compositions, such as curing catalysts, UV absorbers, light stabilizers, antifoaming agents, plasticizers, organic solvents, surface control agents, and antisettling agents. These may be used singly, or in a combination of two or more.

In particular, use of an effect pigment as at least a part of the pigment component in the aqueous second colored coating composition (Y) makes it possible to form a metallic tone or pearlescent tone coating film having a delicate appearance, and thus is preferable.

The aqueous second colored coating composition (Y) can be applied by a known method, such as air spray coating, airless spray coating, or rotary atomization coating. An electrostatic charge may be applied during the coating. It is usually preferable that the coating film thickness be 5 to 40 μm, and more preferably 10 to 30 μm when cured.

Before the aqueous second colored coating composition (Y) is applied, the first colored coating film formed using the aqueous first colored coating composition (X) in step (1) is adjusted to have a solids content of preferably 70 to 100 mass %, particularly preferably 75 to 99 mass %, and further particularly preferably 80 to 98 mass %.

The solids content can be adjusted by preliminary heating (preheating), air-blowing, or other methods. The preheating temperature is room temperature to about 100° C., preferably about 40 to about 90° C., and more preferably about 60 to about 80° C. The preheating time is about 30 seconds to about 15 minutes, preferably about 1 to about 10 minutes, and more preferably about 3 to about 5 minutes.

Step (3)

A clear coating composition (Z) is then applied to the second colored coating film formed using the aqueous second colored coating composition in step (2). The coating composition (present coating composition) of the present invention is applied as the clear coating composition (Z).

The clear coating composition (Z) can be applied by a known method, such as airless spray coating, air spray coating, or rotary atomization coating. An electrostatic charge may be applied during the coating. It is usually preferable that the coating film thickness be 10 to 60 μm, and more preferably 25 to 50 μm, when cured.

Before the clear coating composition (Z) is applied, the second colored coating film formed using the aqueous second colored coating composition (Y) in step (2) is adjusted to have a solids content of preferably 70 to 100 mass %, particularly preferably 75 to 99 mass %, and further particularly preferably 80 to 98 mass %.

Step (4)

The three layers, i.e., the first colored coating film, the second colored coating film, and the clear coating film, of the multilayer coating film formed as described above can be cured all at once by heating at a temperature of typically about 80 to about 170° C., and preferably about 120 to about 160° C., for typically about 10 to about 60 minutes, and preferably about 20 to about 40 minutes, using a usual coating-film-heat-curing method, such as hot-air heating, infrared heating, or high-frequency heating.

EXAMPLES

The present invention will be described in more detail below with reference to Examples and Comparative Examples. However, the present invention is not limited to these Examples. Note that "parts" and "%" are expressed on a mass basis.

Production of Hydroxy-Containing Acrylic Resin (I-1)

Production Example 1

70.7 parts of deionized water and 0.52 parts of "Aqualon KH-10" (trade name, produced by Dai-ichi Kogyo Seiyaku Co., Ltd., emulsifier, active ingredient: 97%) were placed in a reactor equipped with a thermometer, a thermostat, a stirrer, a reflux condenser, and a dropping funnel and mixed by stirring in a nitrogen stream, and the mixture was heated to 80° C. Subsequently, 1% of the total amount of the monomer emulsion described below and 5 parts of a 6% ammonium persulfate aqueous solution were introduced into the reactor, and maintained at 80° C. for 15 minutes. The remaining monomer emulsion was then added dropwise to the reactor over a period of 3 hours while the temperature of the reactor was maintained. After completion of the dropwise addition, the mixture was aged for 1 hour. Then, while 40 parts of a 5% 2-(dimethylamino)ethanol aqueous solution was gradually added to the reactor, the mixture was cooled to 30° C., and filtered through a 100-mesh nylon cloth to obtain a hydroxy-containing acrylic resin emulsion (I-1-1) having a solids concentration of 45%. The obtained hydroxy-containing acrylic resin had an acid value of 12 mg KOH/g, and a hydroxy value of 43 mg KOH/g.

Monomer emulsion: 50 parts of deionized water, 10 parts of styrene, 40 parts of methyl methacrylate, 35 parts of ethyl acrylate, 3.5 parts of n-butyl methacrylate, 10 parts of 2-hydroxyethyl methacrylate, 1.5 parts of acrylic acid, 1.0 part of Aqualon KH-10, and 0.03 parts of ammonium persulfate were mixed by stirring to obtain a monomer emulsion.

Production Example 2

130 parts of deionized water and 0.52 parts of "Aqualon KH-10" were placed in a reactor equipped with a thermometer, a thermostat, a stirrer, a reflux condenser, and a dropping funnel and mixed by stirring in a nitrogen stream, and the mixture was heated to 80° C. Subsequently, 1% of the total amount of the monomer emulsion (1) described below and 5.3 parts of a 6% ammonium persulfate aqueous solution were introduced into the reactor, and maintained at 80° C. for 15 minutes. The remaining monomer emulsion (1) was then added dropwise to the reactor over a period of 3 hours while the temperature of the reactor was maintained. After completion of the dropwise addition, the mixture was aged for 1 hour. The monomer emulsion (2) described below was then added dropwise over a period of 1 hour, and the mixture was aged for 1 hour, after which, while 40 parts of a 5% dimethylethanolamine aqueous solution was gradually added to the reactor, the mixture was cooled to 30° C., and filtered through a 100-mesh nylon cloth to obtain a hydroxy-containing acrylic resin emulsion (I-1-2) having an average particle size of 100 nm (as measured with a "COULTER N4" submicron particle size distribution analyzer (trade name, produced by Beckman Coulter, Inc.) at 20° C. in a state diluted with deionized water), and a solids concentration of 30%. The obtained hydroxy-containing acrylic resin had an acid value of 33 mg KOH/g, and a hydroxy value of 25 mg KOH/g.

Monomer emulsion (1): 42 parts of deionized water, 0.72 parts of Aqualon KH-10, 2.1 parts of methylenebisacrylamide, 2.8 parts of styrene, 16.1 parts of methyl methacrylate, 28 parts of ethyl acrylate, and 21 parts of n-butyl acrylate were mixed by stirring to obtain a monomer emulsion (1).

Monomer emulsion (2): 18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed by stirring to obtain a monomer emulsion (2).

Production of Hydroxy-Containing Polyester Resin (I-2)

Production Example 3

174 parts of trimethylolpropane, 327 parts of neopentyl glycol, 352 parts of adipic acid, 109 parts of isophthalic acid, and 101 parts of 1,2-cyclohexanedicarboxylic acid anhydride were placed in a reactor equipped with a thermometer, a thermostat, a stirrer, a reflux condenser, and a water separator, and the mixture was heated from 160° C. to 230° C. over a period of 3 hours. While the resulting condensation water was distilled off via the water separator and the temperature was maintained at 230° C., a reaction was allowed to proceed until an acid value of 3 mg KOH/g or less was achieved. 59 parts of trimellitic anhydride was added to the reaction product, and an addition reaction was conducted at 170° C. for 30 minutes. The resulting product was then cooled to 50° C. or lower, and neutralized by an equivalent of 2-(dimethylamino)ethanol per acid group". Subsequently, deionized water was gradually added to obtain a hydroxy-containing polyester resin solution (I-2-1) having a solids concentration of 45% and a pH of 7.2. The obtained hydroxy-containing polyester resin had an acid value of 35 mg KOH/g and a hydroxy value of 128 mg KOH/g, and a weight average molecular weight of 13,000.

Production Example 4

109 parts of trimethylolpropane, 141 parts of 1,6-hexanediol, 126 parts of hexahydrophthalic anhydride, and 120 parts of adipic acid were placed in a reactor equipped with a thermometer, a thermostat, a stirrer, a reflux condenser, and a water separator and heated. After the mixture was heated from 160° C. to 230° C. over a period of 3 hours, it was subjected to a condensation reaction at 230° C. for 4 hours. Subsequently, to add carboxy groups to the resulting condensation reaction product, 38.3 parts of trimellitic anhydride was further added, and a reaction was allowed to proceed at 170° C. for 30 minutes. The reaction product was then diluted with 1-octanol (alcohol solvent having a boiling point of 195° C.) to obtain a hydroxy-containing polyester resin solution (I-2-2) having a solids concentration of 70%. The obtained hydroxy-containing polyester resin had an acid value of 46 mg KOH/g, a hydroxy value of 150 mg KOH/g, and a weight average molecular weight of 6,400.

Production of Aqueous First Colored Coating Composition (X)

Production Example 5

56 parts (resin solids: 25 parts) of the hydroxy-containing polyester resin solution (I-2-1) obtained in Production Example 3, 60 parts of JR-806 (produced by Tayca Corporation, trade name, rutile titanium dioxide), 1 part of Carbon MA-100 (produced by Mitsubishi Chemical Corporation, trade name, carbon black), 15 parts of Bariace B-35 (trade name, produced by Sakai Chemical Industry Co., Ltd., barium sulfate powder, average primary particle size: 0.5 µm), 3 parts of MICRO ACE S-3 (trade name, produced by Nippon Talc Co., Ltd., talc powder, average primary particle size: 4.8 µm), and 5 parts of deionized water were mixed. The mixture was adjusted to a pH of 8.0 with 2-(dimethylamino)ethanol and then dispersed using a paint shaker for 30 minutes to obtain a pigment dispersion paste.

Subsequently, 140 parts of the obtained pigment dispersion paste, 33 parts of the hydroxy-containing acrylic resin emulsion (I-1-1) obtained in Production Example 1, 33 parts of the hydroxy-containing polyester resin solution (I-2-1) obtained in Production Example 3, 37.5 parts of Cymel 325 (trade name, produced by Nihon Cytec Industries Inc., melamine resin, solids content: 80%), 26 parts of Bayhydur VPLS2310 (trade name, produced by Sumika Bayer Urethane Co., Ltd., blocked polyisocyanate compound, solids content: 38%), and 43 parts of U-COAT UX-8100 (trade name, produced by Sanyo Chemical Industries, Ltd., urethane emulsion, solids content: 35%) were uniformly mixed.

Thereafter, UH-752 (trade name, produced by ADEKA, thickener), 2-(dimethylamino)ethanol, and deionized water were added to the resulting mixture to obtain an aqueous first colored coating composition (X-1) having a pH of 8.0, a coating composition solids content of 48%, and a viscosity of 30 seconds as measured with Ford cup No. 4 at 20° C.

Production Example 6

An aqueous first colored coating composition (X-2) was obtained in the same manner as in Production Example 5, except that 28.6 parts of U-COAT UX-8100 and 5 parts of Sannix PP-1000 (trade name, produced by Sanyo Chemical Industries, Ltd., polyoxypropylene glycol, number average molecular weight: 1,000, active ingredient: 100%) were used instead of 43 parts of U-COAT UX-8100.

Production Example of Effect Pigment Concentrate

Production Example 7

In a stirring vessel, 19 parts of aluminum pigment paste GX-180A (trade name, produced by Asahi Kasei Metals Ltd., metal content: 74%), 35 parts of 1-octanol (alcohol solvent having a boiling point of 195° C.), 8 parts of phosphoric acid group-containing resin solution (*1), and 0.2 parts of 2-(dimethylamino)ethanol were uniformly mixed to obtain an effect pigment concentrate (P-1).

(*1) Phosphoric acid group-containing resin solution: A mixed solvent of 27.5 parts of methoxypropanol and 27.5 parts of isobutanol was placed in a reactor equipped with a thermometer, a thermostat, a stirrer, a reflux condenser, and a dropping funnel, and heated to 110° C. Then, 121.5 parts of a mixture comprising 25 parts of styrene, 27.5 parts of n-butyl methacrylate, 20 parts of "Isostearyl Acrylate" (trade name, produced by Osaka Organic Chemical Industry Ltd., branched higher alkyl acrylate), 7.5 parts of 4-hydroxybutyl acrylate, 15 parts of phosphoric acid group-containing polymerizable monomer (*2), 12.5 parts of 2-methacryloyloxyethyl acid phosphate, 10 parts of isobutanol, and 4 parts of t-butylperoxyoctanoate was added to the mixed solvent over a period of 4 hours. Further, a mixture comprising 0.5 parts of t-butylperoxyoctanoate and 20 parts of isopropanol was added dropwise for 1 hour. The mixture was then stirred and aged for 1 hour to obtain a phosphoric acid group-containing resin solution having a solids concentration of 50%. The resin had an acid value attributable to the phosphoric acid groups of 83 mg KOH/g, a hydroxy value of 29 mg KOH/g, and a weight average molecular weight of 10,000.

(*2) Phosphoric acid group-containing polymerizable monomer: 57.5 parts of monobutylphosphoric acid and 41 parts of isobutanol were placed in a reactor equipped with a thermometer, a thermostat, a stirrer, a reflux condenser, and a dropping funnel, and heated to 90° C. Thereafter, 42.5 parts of glycidyl methacrylate was added dropwise over a period of 2 hours, and the resulting mixture was stirred and aged for another 1 hour. Subsequently, 59 parts of isopropanol was added to obtain a phosphoric acid group-containing polymerizable monomer solution having a solids concentration of 50%. The obtained monomer had an acid value attributable to the phosphoric acid groups of 285 mg KOH/g.

Production of Aqueous Second Colored Coating Composition (Y)

Production Example 8

100 parts of the hydroxy-containing acrylic resin emulsion (I-1-2) obtained in Production Example 2, 57 parts of the hydroxy-containing polyester resin solution (I-2-2) obtained in Production Example 4, 62 parts of the effect pigment concentrate (P-1) obtained in Production Example 7, and 37.5 parts of Cymel 325 (trade name, produced by Nihon Cytec Industries Inc., melamine resin, solids content: 80%) were uniformly mixed. Further, Primal ASE-60 (trade name, produced by Rohm & Haas Co., thickener), 2-(dimethylamino)ethanol, and deionized water were added to obtain an aqueous second colored coating composition (Y-1) having a pH of 8.0, a coating composition solids content of 25%, and a viscosity of 40 seconds as measured with Ford cup No. 4 at 20° C.

Production of Carboxy-Containing Compound (A)

Production Example 9

680 parts of "Swasol 1000" (trade name, produced by Cosmo Oil Co., Ltd., hydrocarbon organic solvent) was placed in a reactor equipped with a thermometer, a thermostat, a stirrer, a reflux condenser, a nitrogen gas inlet tube, and a dropping funnel, and heated to 125° C. while nitrogen gas was supplied. After the temperature reached 125° C., the nitrogen gas flow was stopped, and the monomer mixture described below was added dropwise at a constant rate over a period of 4 hours. Note that p-tert-butyl peroxy-2-ethylhexanoate is a polymerization initiator.

Monomer mixture: 500 parts of styrene, 500 parts of n-butyl methacrylate, 500 parts of isobutyl methacrylate, 500 parts of maleic anhydride, 1,000 parts of 2-ethoxyethyl propionate, and 100 parts of p-tert-butyl peroxy-2-ethylhexanoate were mixed by stirring to obtained a monomer mixture.

Subsequently, aging was carried out at 125° C. for 30 minutes while nitrogen gas was supplied, and a mixture of 10 parts of p-tert-butyl peroxy-2-ethylhexanoate and 80 parts of "Swasol 1000" was then added dropwise over a period of 1 hour. Thereafter, the mixture was cooled to 60° C. 490 parts of methanol and 4 parts of triethylamine were added, and a half-esterification reaction was carried out while heating under reflux for 4 hours. 326 parts of excessive methanol was then removed under reduced pressure to obtain a carboxy-containing compound (A) solution having a solids content of 55%. The carboxy-containing compound (A) had a number average molecular weight of 3,500 and an acid value of 130 mg KOH/g.

Production of Polyepoxide (B)

Production Example 10

410 parts of xylene and 77 parts of n-butanol were placed in a reactor equipped with a thermometer, a thermostat, a stirrer, a reflux condenser, a nitrogen gas inlet tube, and a dropping funnel, and heated to 125° C. while nitrogen gas was supplied. After the temperature reached 125° C., the nitrogen gas flow was stopped, and monomer mixture 1 described below was added dropwise at a constant rate over a period of 4 hours. Note that azobisisobutyronitrile is a polymerization initiator.

Monomer mixture 1: 432 parts (30%) of glycidyl methacrylate, 576 parts (40%) of n-butyl acrylate, 144 parts (10%) of styrene, 288 parts (20%) of 2-hydroxyethyl methacrylate, and 72 parts of azobisisobutyronitrile were mixed by stirring to obtain a monomer mixture.

Subsequently, aging was carried out at 125° C. for 30 minutes while nitrogen gas was supplied, and further, a mixture of 90 parts of xylene, 40 parts of n-butanol, and 14.4 parts of azobisisobutyronitrile was then added dropwise over a period of 2 hours. Thereafter, the mixture was aged for 2 hours to obtain a polyepoxide (B-1) solution having a solids content of 70%. The obtained polyepoxide (B-1) had a number average molecular weight of 2,000, an epoxy group content of 2.12 mmol/g, and a hydroxy value of 86 mg KOH/g.

Production Example 11

A polyepoxide (B-2) solution having a solids content of 70% was obtained in the same manner as in Production Example 10, except that monomer mixture 2 described below was used instead of monomer mixture 1. The obtained polyepoxide (B-2) had a number average molecular weight of 2,000, an epoxy group content of 2.12 mmol/g, and a hydroxy value of 130 mg KOH/g.
Monomer mixture 2: 432 parts (30%) of glycidyl methacrylate, 432 parts (30%) of n-butyl acrylate, 144 parts (10%) of styrene, 432 parts (30%) of 2-hydroxyethyl methacrylate, 72 parts of azobisisobutyronitrile were mixed by stirring to obtain a monomer mixture.
Production of Clear Coating Composition (Z)

Production Example 12

90.9 parts (solids content: 50 parts) of the carboxy-containing compound (A) solution obtained in Production Example 9, 71.4 parts (solids content: 50 parts) of the polyepoxide (B-1) solution obtained in Production Example 10, 5 parts of Sannix PP-1000 (trade name, produced by Sanyo Chemical Industries, Ltd., polyoxypropylene glycol, number average molecular weight: 1,000, active ingredient: 100%), 1 part of TBAB (trade name, produced by LION AKZO, tetrabutylammonium bromide, active ingredient: 100%), 0.2 parts of BYK-300 (trade name, produced by BYK-Chemie, surface control agent, active ingredient: 52%), 2.0 parts of TINUVIN900 (trade name, produced by B.A.S.F., benzotriazol UV absorber, active ingredient: 100%), and 1.0 part of TINUVIN123 (trade name, produced by B.A.S.F., hindered amine light stabilizer, active ingredient: 100%) were uniformly mixed, and Swasol 1000 (trade name, produced by Cosmo Oil Co., Ltd., hydrocarbon solvent) was further added to obtain a clear coating composition (Z-1) having a viscosity of 25 seconds as measured with Ford cup No. 4 at 20° C.

Production Examples 13 to 25

Following the procedure of Production Example 12 and using the components in the amounts shown in Table 1, clear coating compositions (Z-2) to (Z-14) having a viscosity of 25 seconds as measured with Ford cup No. 4 at 20° C. were obtained. The clear coating compositions (Z-11) to (Z-14) were used for Comparative Examples.

The amounts of the components of the clear coating compositions (Z-1) to (Z-14) in Table 1 are on a solids basis.
(Note 1) to (Note 9) regarding the polyol (C) in Table 1 are as follows.

(Note 1) Sannix PP-400; trade name, produced by Sanyo Chemical Industries, Ltd., polyoxypropylene glycol, number average molecular weight: 400, active ingredient: 100%
(Note 2) Sannix PP-600; trade name, produced by Sanyo Chemical Industries, Ltd., polyoxypropylene glycol, number average molecular weight: 600, active ingredient: 100%
(Note 3) Sannix PP-2000; trade name, produced by Sanyo Chemical Industries, Ltd., polyoxypropylene glycol, number average molecular weight: 2,000, active ingredient: 100%
(Note 4) #600; trade name, produced by Dai-ichi Kogyo Seiyaku Co., Ltd., polyoxyethylene glycol, number average molecular weight: 600, active ingredient: 100%
(Note 5) GP-600; trade name, produced by Sanyo Chemical Industries, Ltd., polyoxypropylene glyceryl ether, number average molecular weight: 600, active ingredient: 100%
(Note 6) PTMG-850; trade name, produced by Mitsubishi Chemical Corporation, polyoxytetramethylene glycol, number average molecular weight: 850, active ingredient: 100%
(Note 7) ETERNACOLL UH-50; trade name, produced by Ube Industries, Ltd., 1,6-hexanediol-based polycarbonate diol, number average molecular weight: 500, active ingredient: 100%
(Note 8) ETERNACOLL UH-200; trade name, produced by Ube Industries, Ltd., 1,6-hexanediol-based polycarbonate diol, number average molecular weight: 2,000, active ingredient: 100%
(Note 9) Polylite OD-X-240; trade name, produced by DIC, polyester polyol, number average molecular weight: 1,000, active ingredient: 100%
Coating Film-Forming Method
Using the aqueous first colored coating compositions (X-1) and (X-2) obtained in Production Examples 5 and 6, the aqueous second colored coating composition (Y-1) obtained in Production Example 8, and the clear coating compositions (Z-1) to (Z-14) obtained in Production Examples 12 to 25, test plates were prepared and evaluation tests were performed in the manner described below.
(Preparation of Test Substrates)
Electron GT-10 (trade name, produced by Kansai Paint Co., Ltd., cationic electrodeposition coating composition) was applied to a cold-rolled steel plate treated with zinc phosphate by electrodeposition to a film thickness of 20 μm (when dried), and cured by heating at 170° C. for 30 minutes to prepare test substrate 1. Test substrate 1 had a surface roughness Ra of 0.21.

Further, following the procedure of the preparation for test substrate 1 and using a cold-rolled steel plate that was treated with zinc phosphate and had a surface roughness larger than that of the cold-rolled steel plate used for test substrate 1, test substrate 2 that had a surface roughness larger than that of test substrate 1 was prepared. Test substrate 2 had a surface roughness Ra of 0.38.
(Preparation of Test Plates)

Example 1

The aqueous first colored coating composition (X-1) obtained in Production Example 5 was electrostatically applied to test substrate 1 to a film thickness of 25 μm (when dried) using a rotary atomizing electrostatic coating apparatus. The resulting substrate was allowed to stand for 2 minutes, followed by preheating at 80° C. for 3 minutes.

Subsequently, the aqueous second colored coating composition (Y-1) obtained in Production Example 8 was electrostatically applied to the uncured first colored coating film to a film thickness of 15 μm (when dried) using a rotary atomizing electrostatic coating apparatus. The resulting substrate was allowed to stand for 2 minutes, followed by preheating at 80° C. for 3 minutes.

Further, the clear coating composition (Z-1) obtained in Production Example 12 was electrostatically applied to the second colored coating film to a film thickness of 35 μm (when dried). The resulting substrate was allowed to stand for 7 minutes, and then heated at 140° C. for 20 minutes (retention time) to cure the first colored coating film, the second colored coating film, and the clear coating film, thereby preparing a test plate.

Examples 2 to 11 and Comparative Examples 1 to 6

Test plates were prepared in the same manner as in Example 1, except that test substrate 1 or 2 shown in Table 1 was used as a test substrate, the aqueous first colored coating composition (X-1) or (X-2) shown in Table 1 was used as an aqueous first colored coating composition (X), and any of the clear coating compositions (Z-1) to (Z-14) shown in Table 1 was used as a clear coating composition (Z).

Evaluation Test

The test plates obtained in Examples 1 to 11 and Comparative Examples 1 to 6 were evaluated by the test methods described below. Table 1 shows the evaluation results.

(Test Methods)

Smoothness: evaluated based on a Wc value measured using Wave Scan DOI (trade name, produced by BYK Gardner). The Wc value is an index of the amplitude of surface roughness at a wavelength of about 1 to about 3 mm. A smaller Wc value indicates a higher smoothness of the coated surface.

Distinctness of image: evaluated based on a Wa value measured using Wave Scan DOI. The Wa value is an index of the amplitude of surface roughness at a wavelength of about 0.1 to about 0.3 mm. A smaller Wa value indicates a higher distinctness of image of the coated surface.

Accelerated weathering resistance: a cycle test that combines irradiation and rainfall conditions was performed under the test conditions described in JIS K5600-7-7 (method 1), using the Super Xenon Weather Meter (trade name, accelerated weathering tester, produced by Suga Test Instruments Co., Ltd.) (specimen wetting cycle: 18 minutes/2 hours, black panel temperature: 61 to 65° C.) After a total of 3,000 hours of the cycle test time, each test plate was immersed in warm water at 40° C. for 2 days, and the adhesion of the coating film was then evaluated. Adhesion was evaluated by forming a grid of 100 squares (2 mm×2 mm) on the coating film of each test plate in accordance with JIS K 5600-5-6 (1990), applying adhesive tape to the surface of the grid portion, peeling the tape off rapidly, and then checking the number of coating film squares remaining. 98 or more squares of the coating film remaining is regarded as an acceptable level.

TABLE 1

| | | Example | | | | | | | | | | | Comparative Example | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 | 5 | 6 |
| Test Substrate | | 1 | 1 | 1 | 1 | 1 | 1 | 1 | 1 | 1 | 1 | 2 | 1 | 1 | 1 | 1 | 1 | 2 |
| Aqueous First Colored Coating Composition (X) | | X-1 | X-1 | X-1 | X-1 | X-1 | X-1 | X-1 | X-1 | X-1 | X-1 | X-1 | X-1 | X-1 | X-1 | X-1 | X-2 | X-1 |
| Aqueous Second Colored Coating Composition (Y) | | Y-1 | Y-1 | Y-1 | Y-1 | Y-1 | Y-1 | Y-1 | Y-1 | Y-1 | Y-1 | Y-1 | Y-1 | Y-1 | Y-1 | Y-1 | Y-1 | Y-1 |
| Clear Coating Composition (Z) | Coating Composition Name | Z-1 | Z-2 | Z-3 | Z-4 | Z-5 | Z-6 | Z-7 | Z-8 | Z-9 | Z-10 | Z-1 | Z-11 | Z-12 | Z-13 | Z-14 | Z-14 | Z-14 |
| | Carboxy-containing Compound (A) | 50 | 50 | 50 | 50 | 50 | 50 | 50 | 50 | 50 | 50 | 50 | 50 | 50 | 50 | 50 | 50 | 50 |
| | Polyepoxide (B-1) | 50 | 50 | 50 | | 50 | 50 | 50 | 50 | 50 | 50 | 50 | 50 | 50 | 50 | 50 | 50 | 50 |
| | Polyepoxide (B-2) | | | | 50 | | | | | | | | | | | | | |
| Polyol (C) | PP-1000 | 5 | 2 | 16 | 5 | | | | | | 5 | | | | | | | |
| | PP-400 (Note 1) | | | | | 5 | | | | | | | | | | | | |
| | PP-600 (Note 2) | | | | | | 5 | | | | | | | | | | | |
| | PP-2000 (Note 3) | | | | | | | | | | | | | 5 | | | | |
| | #600 (Note 4) | | | | | | | 5 | | | | | | | | | | |
| | GP-600 (Note 5) | | | | | | | | 5 | | | | | | | | | |
| | PTMG-850 (Note 6) | | | | | | | | | 5 | | | | | | | | |
| | UH-50 (Note 7) | | | | | | | | | | 5 | | | | | | | |
| | UH-200 (Note 8) | | | | | | | | | | | | | | 5 | | | |
| | OD-X-240 (Note 9) | | | | | | | | | | | | | | | 5 | | |

TABLE 1-continued

| | Example | | | | | | | | | | | Comparative Example | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 | 5 | 6 |
| TBAB | 1 | 1 | 1 | 1 | 1 | 1 | 1 | 1 | 1 | 1 | 1 | 1 | 1 | 1 | 1 | 1 | 1 |
| BYK-300 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| TINUVIN900 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| TINUVIN123 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Smoothness | 13.2 | 14.6 | 10.7 | 13.3 | 11.6 | 12.2 | 12.3 | 13.0 | 13.0 | 12.4 | 18.9 | 21.2 | 21.5 | 21.8 | 23.9 | 20.8 | 39.4 |
| Distinctness of Image | 11.6 | 12.7 | 9.7 | 11.8 | 9.9 | 10.6 | 10.8 | 11.3 | 11.5 | 10.7 | 16.0 | 19.4 | 19.9 | 20.1 | 20.7 | 18.9 | 35.1 |
| Accelerated Weathering Resistance (Adhesion) | 100 | 100 | 98 | 100 | 100 | 100 | 99 | 100 | 100 | 100 | 100 | 100 | 92 | 43 | 100 | 100 | 100 |

The invention claimed is:

1. A coating composition used as a clear coating composition (Z) in a method for forming a multilayer coating film, the method comprising sequentially performing the following steps (1) to (4) on a substrate:
    (1) applying an aqueous first colored coating composition (X) to form a first colored coating film;
    (2) applying an aqueous second colored coating composition (Y) to the first colored coating film formed in step (1) to form a second colored coating film;
    (3) applying a clear coating composition (Z) to the second colored coating film formed in step (2) to form a clear coating film; and
    (4) heat-curing the first colored coating film, the second colored coating film, and the clear coating film formed in steps (1) to (3), all at once,
the coating composition comprising a carboxy-containing compound (A), a polyepoxide (B), a polyol (C) having a number average molecular weight of 300 to 1,500, and a quaternary salt catalyst,
    wherein the polyol (C) is polyoxypropylene glycol or polyoxytetramethylene glycol,
    wherein an amount of the polyol (C) is 1 to 20 mass % based on a total solids content of the carboxy-containing compound (A) and polyepoxide (B), and
    wherein the polyepoxide (B) is an epoxy-containing acrylic polymer.

2. A method for forming a multilayer coating film, the method comprising performing the following steps (1) to (4) on a substrate:
    (1) applying an aqueous first colored coating composition (X) to form a first colored coating film;
    (2) applying an aqueous second colored coating composition (Y) to the first colored coating film formed in step (1) to form a second colored coating film;
    (3) applying a clear coating composition (Z) according to claim 1 to the second colored coating film of step (2) to form a clear coating film; and
    (4) heat-curing the first colored coating film, the second colored coating film, and the clear coating film formed in steps (1) to (3), all at once.

3. The method for forming a multilayer coating film according to claim 2, wherein the substrate is a vehicle body on which an undercoating film has been formed using an electrodeposition coating composition.

4. An article coated with a multilayer coating film comprising the coating composition according to claim 1.

5. A vehicle body coated with a multilayer coating film comprising the coating composition according to claim 1, wherein the vehicle body comprises an undercoating film formed thereon using an electrodeposition coating composition.

6. The coating composition according to claim 1, wherein an amount of the quaternary salt catalyst is 0.01 to 5 mass % based on the total solids content of the carboxy-containing compound (A) and the polyepoxide (B).

* * * * *